UNITED STATES PATENT OFFICE 2,510,279

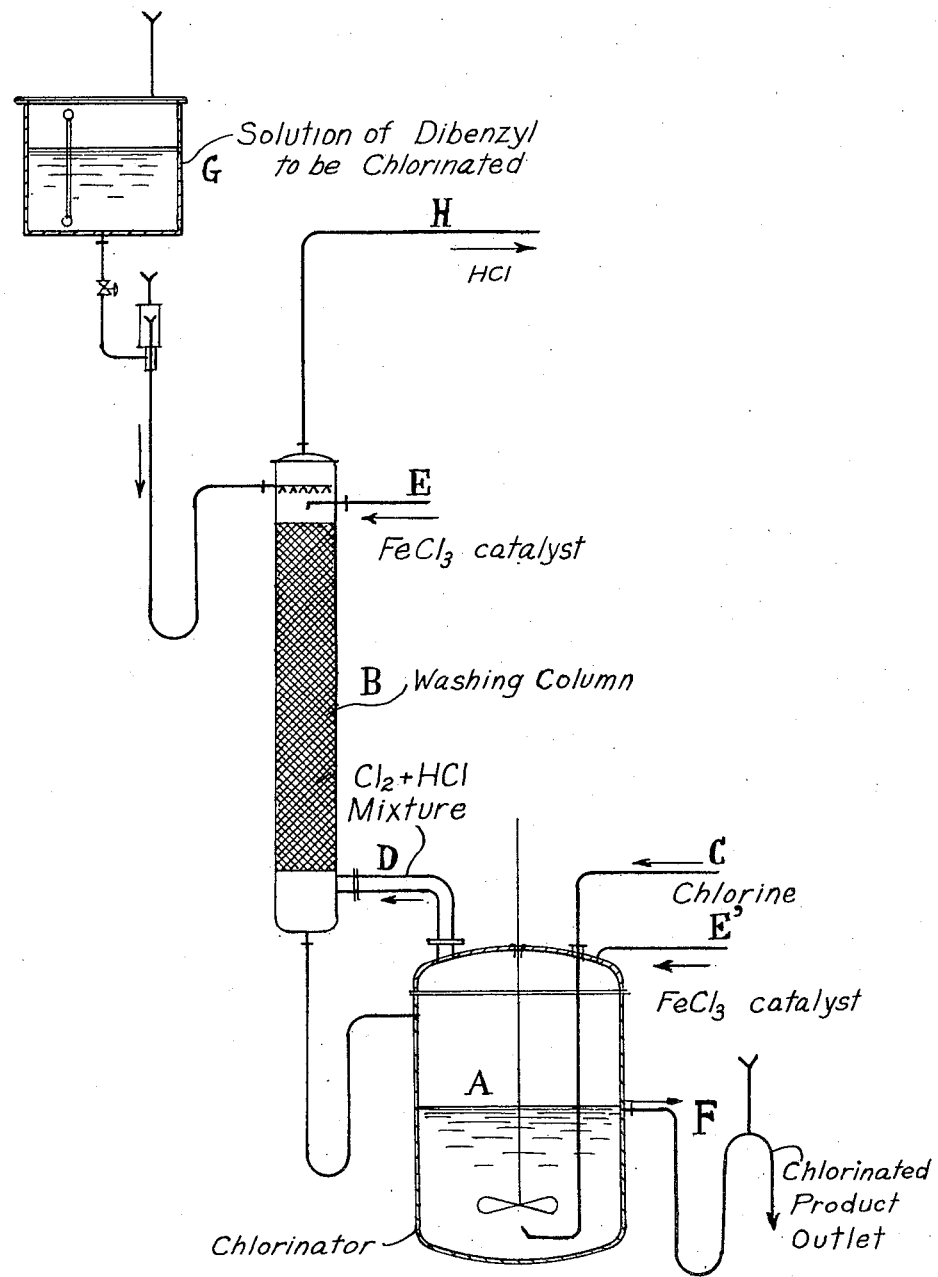

METHOD OF CHLORINATING DIBENZYL AND NUCLEARLY-ALKYL-SUBSTITUTED DIBENZYLS

André Gislon, Paris, and Joseph Quiquerez, Saint-Cloud, France

Application March 29, 1945, Serial No. 585,565
In France March 31, 1944

4 Claims. (Cl. 260—649)

This invention relates to chlorinated dibenzyl and substituted dibenzyls.

The application of chlorinated dibenzyl to the nucleus for plasticizing rubber requires a very pure product adapted to be manufactured on an industrial scale with an excellent yield. This is not true of the chlorinating methods proposed heretofore for dibenzyl.

Thus the chlorination in presence of iodine produces iodinated substances which it is difficult to separate from the chlorinated derivatives and which are not stable when heated, whereby iodine is liberated when the product is kneaded and molded with vinyl chloride and there may even be a catalytic decomposition in such case which leads to a hardening of the plasticized product.

It is well known that chlorination in presence of antimony pentachloride as performed for chlorinating diphenyl leads to an opening of the aliphatic bridge separating the aromatic nuclei of the dibenzyl. The case is the same when it is attempted to chlorinate at high temperature in presence of a catalyst such as $FeCl_3$ in proportions of 1% and more, said method being suitable for the chlorination of diphenyl but not being applicable on an industrial scale to dibenzyl and its derivatives. In addition to the opening of the bridge there is often a dehydrogenation with the formation of compounds of stilbene. Moreover by reason of the formation of a composite product, there arise secondary reactions of the Friedel and Crafts type which lead to the formation of tarry products and consequently to a reduction in the yield and in the plasticizing value of the product obtained.

Our invention resides in a method for chlorinating dibenzyl and its alkylated compounds and more generally substances, alkylated or not, having the following formula:

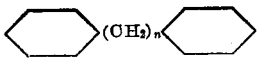

This method consists firstly in chlorinating in presence of an extremely small amount (the magnitude of which is about 0.2%) of a catalyst of medium activity of the Friedel and Crafts type such as $FeCl_3$, secondly in performing the chlorination at substantially room temperature, preferably at about 20 to 25°, and finally in operating in presence of solvents which allow the obtaining of a very homogeneous chlorination.

Example

We have obtained a valuable plasticizer by chlorinating a commercial product formed by distilling the condensation product of dichlorethane with a mixture of benzene and toluene and constituted chiefly by a mixture of dibenzyl, methyldibenzyl and dimethyldibenzyl.

100 parts of this distillate are dissolved in 150 parts of carbon tetrachloride to which are added 0.2 part of anhydrous iron chloride. Chlorine is then introduced at 20 to 25° C. while the mixture is energetically stirred until a product is obtained which contains from 25 to 35% of chlorine. The reaction product is washed in water and the solvent is carried away in a current of steam. This provides a colorless iron-free product which may be used as a plasticizer either directly or after distillation.

We have found moreover that if a continuous execution of the method in accordance with the invention is sought for, there arises a certain difficulty with respect to introducing the catalyst into the reacting mixture because the ferric chloride or the compounds which it is liable to form with the products undergoing chlorination, is only slightly soluble and is therefore not distributed in a homogeneous manner the liquid feeding the chlorinated apparatus itself.

Obviously it is also possible to add the catalyst in a dispersed form to the products to be chlorinated or to a given portion thereof, while keeping same constantly stirred so as to avoid settling. We have found however that it is possible or even preferable to add to the reacting agents together with the product to be chlorinated, a solution of the catalyser in a further solvent. We may mention among the further solvents to be used for this purpose without our list being by means a limitative one: ketones, aliphatic halogenides or again the chlorinated products formed by the reaction itself.

This method of operation results in the production of a very fine dispersion of ferric chloride in the reacting products in which form it appears to be particularly active.

We have shown by way of example in the accompanying drawing an apparatus for executing the process.

The chlorination apparatus comprises for example a vat A provided with a powerful stirrer and with cooling means not shown. This vat receives in a continuous manner the product to be chlorinated such as for instance a solution of an aromatic hydrocarbon in carbon tetrachloride fed from the container G through a column B, the function of which is disclosed hereinafter, while the chlorine is fed into the vat through the pipe C.

At least part of the solution of the catalyst is introduced into the reacting mixture ahead of the washing column through the pipe E while the remainder of the catalyst solution is introduced directly into the reaction vat through the pipe E'. The syphon F is used for drawing out in a continuous manner from the vat the chlorinated product having the desired content of chlorine as determined by the relative proportion of chlorine and of hydrocarbon in the reaction vat.

The hydrochloric acid evolved flows from the vat A through the pipe D and is washed in the column B by the liquid from the tank G. This column serves to absorb the chlorine which may be carried with the hydrochloric acid. After it has been washed, the hydrochloric acid escapes through the pipe H. A specific example of a method of carrying out our invention is given below.

The vat being charged with one ton of product there is introduced therein at a rate of 250 kgs. per hour a solution of equal parts of dibenzyl in carbon tetrachloride and simultaneously a dispersion of 400 gr. of ferric chloride in 2 kgs. of dichlorodibenzyl. There is introduced simultaneously 31 m.$^3$ per hour of chlorine, as measured at 0° C. and 760 mm. of mercury. The apparatus produces thus in a continuous flow a solution of 174 kgs. of dichlorodibenzyl in 125 kgs. of solvent which latter is eliminated by a current of steam which carries it away so as to separate it from the desired product.

What we claim is:

1. A method of chlorinating a substance selected from the group consisting of dibenzyl and dibenzyls having at least one of the benzyl groups alkyl-substituted on the aromatic ring, which consists in preparing a carbon tetrachloride solution of said substance containing a ferric chloride catalyst present to the extent of about 0.2% by weight of said substance, and chlorinating said solution by means of chlorine at a temperature of about 20° C.–25° C.

2. A method of chlorinating a substance selected from the group consisting of dibenzyl and dibenzyls having at least one of the benzyl groups alkyl-substituted on the aromatic ring, which consists in preparing a chlorinated solvent solution of said substance containing a ferric chloride catalyst present to the extent of about 0.2% by weight of said substance, and chlorinating said solution by means of chlorine at a temperature of about 20° C. to 25° C.

3. A method of chlorinating a substance selected from the group consisting of dibenzyl and dibenzyls having at least one of the benzyl groups alkyl-substituted on the aromatic ring, which consists in preparing a chlorinated solvent solution of said substance containing a ferric chloride catalyst present to the extent of about 0.2% by weight of said substance, and chlorinating said solution by means of chlorine at about room temperature.

4. The continuous process of chlorinating a substance selected from the group consisting of dibenzyl and dibenzyls having at least one of the benzyl groups alkyl-substituted on the aromatic ring, which consists in establishing and maintaining a reaction zone, continuously supplying a chlorinated solvent solution of said substance to an upper portion of said zone, continuously supplying a dispersion of ferric chloride catalyst in a portion of said substance to the zone, maintaining the proportion of said catalyst to said substance at about 0.2% by weight of said substance, maintaining the zone at about room temperature, continuously supplying gaseous chlorine to a lower portion of said zone, removing evolved gas from the zone, and continuously removing chlorinated product from the zone at a region therein which is remote from the region where said chlorinated solvent solution is being supplied.

ANDRÉ GISLON.
QUIQUEREZ, JOSEPH.

REFERENCES CITED

The following references are of record in the file of this patent:

UNITED STATES PATENTS

| Number | Name | Date |
|---|---|---|
| 1,835,754 | Britton et al. | Dec. 8, 1931 |
| 1,890,772 | Dykstra | Dec. 13, 1932 |
| 2,033,612 | Clark et al. | Mar. 10, 1936 |
| 2,243,543 | ter Horst | May 27, 1941 |
| 2,346,000 | Barber | Apr. 4, 1944 |
| 2,353,434 | Barber | July 11, 1944 |
| 2,403,179 | Hull et al. | July 2, 1946 |

FOREIGN PATENTS

| Number | Country | Date |
|---|---|---|
| 872,900 | France | June 22, 1942 |